(12) United States Patent
Lanzillo et al.

(10) Patent No.: US 12,293,140 B2
(45) Date of Patent: May 6, 2025

(54) FEED-FORWARD DESIGN OF THREE-DIMENSIONAL QUANTUM CHIPS

(71) Applicant: International Business Machines Corporation, Armonk, NY (US)

(72) Inventors: Nicholas Anthony Lanzillo, Wynantskill, NY (US); Marco Facchini, New York, NY (US); Zlatko Kristev Minev, White Plains, NY (US); Thomas George McConkey, Long Island, NY (US); Priti Ashvin Shah, Basking Ridge, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 17/657,543

(22) Filed: Mar. 31, 2022

(65) Prior Publication Data
US 2023/0315966 A1  Oct. 5, 2023

(51) Int. Cl.
| | | |
|---|---|---|
| *G06F 30/392* | (2020.01) | |
| *G06F 30/30* | (2020.01) | |
| *G06N 10/40* | (2022.01) | |
| *G06F 119/08* | (2020.01) | |

(52) U.S. Cl.
CPC ........... *G06F 30/392* (2020.01); *G06N 10/40* (2022.01); *G06F 2119/08* (2020.01)

(58) Field of Classification Search
None
See application file for complete search history.

(56) References Cited

U.S. PATENT DOCUMENTS

| | | |
|---|---|---|
| 9,477,796 B2 | 10/2016 | Garcia-Ramirez et al. |
| 9,665,829 B1 | 5/2017 | Jasionowski |
| 10,140,404 B2 | 11/2018 | Rigetti et al. |
| 10,909,286 B2 | 2/2021 | Johnston |
| 11,042,812 B2 | 6/2021 | Jasionowski |
| 11,182,523 B2 | 11/2021 | Greenberg et al. |

(Continued)

FOREIGN PATENT DOCUMENTS

WO     2020172504 A1     8/2020

OTHER PUBLICATIONS

G. Neela et al., "Congestion-Aware Optimal Techniques for Assigning Inter-Tier Signals to 3D-Vias in a 3DIC, " IEEE 2015 Int'l 3D Systems Integration Conference, pp. 245-250. (Year: 2015).*

(Continued)

*Primary Examiner* — Leigh M Garbowski
(74) *Attorney, Agent, or Firm* — Amin, Turocy & Watson, LLP

(57) ABSTRACT

Systems, computer-implemented methods, and computer program products to facilitate feed-forward design of three-dimensional quantum chips are provided. According to an embodiment, a system can comprise a processor that executed computer executable components stored in memory. The computer executable components can comprise an analysis component that performs an analysis of a first layout of a first quantum chip. The computer executable components further comprise a modification component that modifies a second layout of a second quantum chip based on the analysis of the first layout.

20 Claims, 10 Drawing Sheets

(56) References Cited

U.S. PATENT DOCUMENTS

| | | | |
|---|---|---|---|
| 2019/0122911 | A1 | 4/2019 | Briggs et al. |
| 2019/0236218 | A1 | 8/2019 | Paik et al. |
| 2020/0074035 | A1 | 3/2020 | Javadiabhari et al. |
| 2020/0172504 | A1 | 6/2020 | Balbas et al. |
| 2021/0303757 | A1 | 9/2021 | Pandey et al. |
| 2021/0342729 | A1* | 11/2021 | Scheer ................ H10N 69/00 |
| 2024/0295617 | A1* | 9/2024 | Bestwick ........... G01R 33/0358 |

OTHER PUBLICATIONS

Minev et al. | "Energy-participation quantization of Josephson circuits". https://doi.org/10.48550/arXiv.2010.00620, dated Aug. 16, 2021, 42 pages.

Minev et al. | "Circuit quantum electrodynamics (cQED) with modular quasi-lumped models". https://arxiv.org/pdf/2103.10344.pdf, dated Mar. 18, 2021, 13 pages.

International Search Report and Written Opinion received for PCT Application Serial No. PCT/IB2023/052938 dated Jun. 19, 2023, 14 pages.

Maezawa et al., "Toward Practical-Scale Quantum Annealing Machine for Prime Factoring", National Institute of Advanced Industrial Science and Technology, Sep. 5, 2018, 17 pages.

Rosenberg et al., "3d Integration and Packaging for Solid-state Qubits", arXiv: 1906.11146v2 [quant-ph], Jul. 24, 2019, 22 pages.

Hidaka Mutsuo, "Japanese Activities For Superconducting Circuits Using Flip-chip Configurations", National Institute of Advanced Industrial Science and Technology, 2019, 11 pages.

\* cited by examiner

FEED-FORWARD DESIGN OF THREE-DIMENSIONAL QUANTUM CHIPS

BACKGROUND

The subject disclosure relates to design of three-dimensional quantum chips, and more specifically, to feed-forward design of three-dimensional quantum chips.

Use of three-dimensional quantum chips has great potential to address a variety of challenges involving quantum computing. For example, by bonding multiple quantum chips, three-dimensional quantum chips can be produced that offer improved computational performance.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate feed-forward design of three-dimensional quantum chips are described.

According to an embodiment, a system can comprise a processor that executes computer executable components stored in memory. The computer executable components comprise an analysis component that performs analysis of a first layout of a first quantum chip. The computer executable components further comprise a modification component that modifies a second layout of a second quantum chip based on the analysis of the first layout. An advantage of such a system is that it can facilitate improved performance in the second quantum chip.

In some embodiments, the analysis component performs a second analysis of the second layout of the second quantum chip and the modification component modifies the first layout of the first quantum chip based on the second analysis. An advantage of such a system is that it can facilitate improved performance in the first quantum chip.

According to another embodiment, a computer-implemented method can comprise performing, by a system, operatively coupled to a processor, analysis of a first layout of a first quantum chip. The computer-implemented method can further comprise modifying, by the system, a second layout of a second quantum chip based on the analysis of the first layout. An advantage of such a computer-implemented method is that it can facilitate improved performance in the second quantum chip.

In some embodiments, the above computer-implemented method can further comprise, performing, by the system, analysis of the second layout of the second quantum chip. The computer-implemented method can further comprise modifying, by the system the first layout of the first quantum chip based on the analysis of the second layout. An advantage of such a computer-implemented method is that it can facilitate improved performance in the first quantum chip.

According to another embodiment, a computer program product comprising a computer readable storage medium having program instructions embodied therewith, the program instructions executable by a processor to cause the processor to perform, by the processor, analysis of a first layout of a first quantum chip. The program instructions are further executable by the processor to cause the processor to modify a second layout of a second quantum chip based on the analysis of the first layout. An advantage of such a computer program product is that it can facilitate improved performance in the second quantum chip.

In some embodiments, the program instructions are further executable by the processor to cause the processor to perform analysis of the second layout of the second quantum chip. The program instructions are further executable by the processor to cause the processor to modify the first layout of the first quantum chip based on the analysis of the second layout. An advantage of such a computer program product is that it can facilitate improved performance in the first quantum chip.

DETAILED DESCRIPTION

Figure 1:
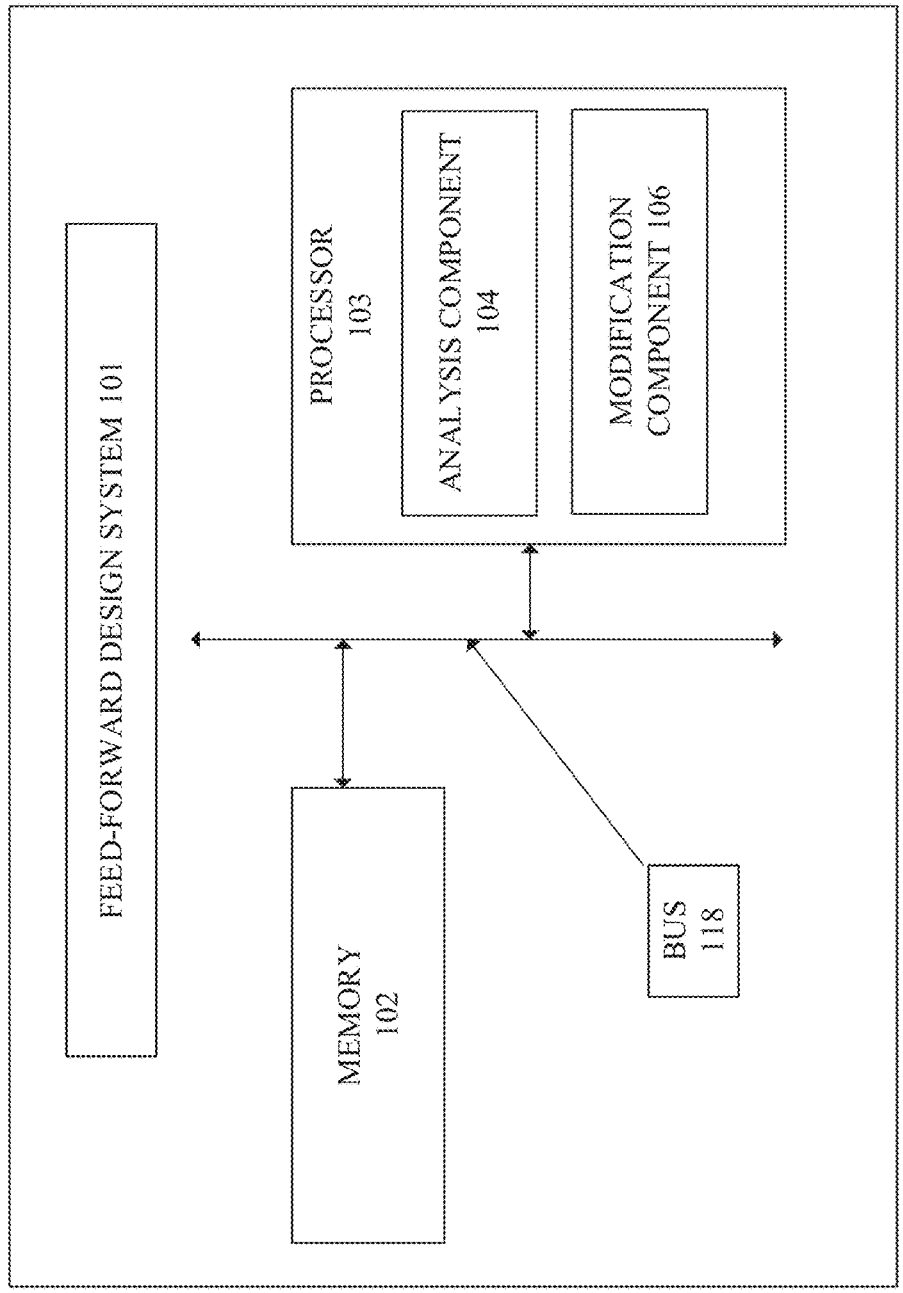
FIG. 1 illustrates a block diagram of an example, non-limiting system that can facilitate feed-forward design of three-dimensional quantum chips.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A problem with existing three-dimensional quantum chip design is that the quantum chips are designed sequentially. As such, in existing methods, the design of a second quantum chip is not influence by the design and/or modification of a first quantum chip. This leads to situations in which a three-dimensional quantum chip formed by connecting the first and second quantum chips suffers from decreased performance due to non-idealities in the fabrication of the first quantum chip and/or a lack of optimization of the design of the second quantum chip.

Given problems described above with existing design methods of three-dimensional quantum chips, the present disclosure can be implemented to produce a solution to these problems in the form of systems, computer-implemented methods, and/or computer program products that can facilitate feed-forward design of three-dimensional quantum chips by: performing analysis of a first layout of a first quantum chip; and modifying a second layout of a second quantum chip based on the analysis of the first layout. An advantage of such systems, computer-implemented methods, and/or computer program products is that they can be implemented in order to improve performance of three-dimensional quantum chips as the design of the second quantum chip can be modified based on the first quantum chip.

In some embodiments, the present disclosure can be implemented to produce a solution to the problems described above in the form of systems, computer-implemented methods, and/or computer program products that can further facilitate feed-forward design of three-dimensional quantum chips by: performing analysis of the second layout of the second quantum chip; and modifying, by the system the first layout of the first quantum chip based on the analysis of the second layout. An advantage of such systems, computer-implemented methods, and/or computer program products is that they can be implemented in order to improve performance of three-dimensional quantum chips as the design of the first quantum chip can be modified based on the second quantum chip.

FIG. 1 illustrates block diagrams of example, non-limiting system 101 that can facilitate feed-forward design of three-dimensional quantum chips. Feed-forward design system 101 can comprise a memory 102, a processor 103, an analysis component 104, a modification component 106 and/or a bus 118.

It should be appreciated that the embodiments of the subject disclosure depicted in various figures disclosed herein are for illustration only, and as such, the architecture of such embodiments are not limited to the systems, devices, and/or components depicted therein. For example, in some embodiments, feed-forward design system 101 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 and/or other figures disclosed herein.

Memory 102 can store one or more computer and/or machine readable, writable, and/or executable components and/or instructions that, when executed by processor 103 (e.g., a classical processor, a quantum processor, and/or another type of processor), can facilitate performance of operations defined by the executable component(s) and/or instruction(s). For example, memory 102 can store computer and/or machine readable, writable, and/or executable components and/or instructions that, when executed by processor 103, can facilitate execution of the various functions described herein relating to feed-forward design system 101, analysis component 104, modification component 106, and/or another component associated with feed-forward design system 101 as described herein with or without reference to various figures of the subject disclosure.

Memory 102 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 102 are described below with reference to system memory 1016 and FIG. 10. Such examples of memory 102 can be employed to implement any embodiments of the subject disclosure.

Processor 103 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 102. For example, processor 103 can perform various operations that can be specified by such computer and/or machine readable, writable, and/or executable components and/or instructions including, but not limited to, logic, control, input/output (I/O), arithmetic, and/or the like. In some embodiments, processor 103 can comprise one or more central processing unit, multi-core processor, microprocessor, dual microprocessors, microcontroller, System on a Chip (SOC), array processor, vector processor, quantum processor, and/or another type of processor. Further examples of processor 103 are described below with reference to processing unit 1014 and FIG. 10. Such examples of processor 103 can be employed to implement any embodiments of the subject disclosure.

Feed-forward design system 101, memory 102, processor 103, analysis component 104, modification component 106 and/or another component of feed-forward design system 101 as described herein can be communicatively, electrically, operatively, and/or optically coupled to one and other via bus 118 to perform functions of feed-forward design system 101 and/or components coupled therewith. Bus 118 can comprise one or more memory bus memory controller, peripheral bus, external bus, local bus, quantum bus, and/or another type of bus that can employ various bus architectures. Further examples of bus 118 are described below with reference to system bus 118 and FIG. 10. Such examples of bus can be employed to implement any embodiments of the subject disclosure.

Feed-forward design system 101 can comprise any type of component, machine, device, facility, apparatus, and/or instrument that comprises a processor and/or can be capable of effective and/or operative communication with a wired and/or wireless network. All such embodiments are envisioned. For example, feed-forward design system 101 can comprise a server device, a computing device, a general-purpose computer, a special-purpose computer, a quantum computing device (e.g., a quantum computer), a tablet computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

Feed-forward design system 101 can be coupled (e.g., communicatively, electrically, operatively, optically, and/or coupled via another type or coupling) to one or more external systems, sources, and/or devices (e.g., classical and or/quantum computing devices, communication devices, and/or another type of external system, source, and/or device) using a wire and/or cable. For example. Feed-forward design system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, feed-forward design system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Feed-forward design system 101 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, feed-forward design system 101 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between feed-forward design system 101 an external system, sources, and/or devices (e.g., computing devices, communication devices, and/or another type of external system, source, and/or device).

Feed-forward design system 101 can comprise one or more computer and/or machine readable, writable, and/or executable components and/or instructions that, when executed by processor 103 (e.g., a classical processor, a quantum processor, and/or another type of processor), can facilitate performance of operations defined by such component(s) and/or instruction(s). Further, in numerous embodiments, any component associated with feed-forward design system 101, as described herein with or without reference to the various figures of the subject disclosure, can comprise one or more computer and/or machine readable, writable, and/or executable components and/or instructions that, when executed by processor 103, can facilitate performance of operations defined by such component(s) and/or instruction(s). For example, analysis component 104, modification component 106, and/or any other components associated with feed-forward design system 101 as disclosed herein (e.g., communicatively, electronically, operatively, and/or optically coupled with and/or employed by feed-forward design system 101), can comprise such computer and/or machine readable, writable, and/or executable component(s) and/or instructions(s). Consequently, according to numerous embodiments, feed-forward design system 101 and/or any components associated therewith as disclosed herein, can employ processor 103 to execute such computer and/or machine readable, writable, and/or executable component(s) and/or instruction(s) to facilitate performance of one or more operations described herein with reference to feed-forward design system 101 and/or any such components associated therewith.

Feed-forward design system 101 can facilitate (e.g., via processor 103): performance of operations executed by and/or associated with analysis component 104, modification component 106, and/or another component associated with feed-forward design system 101 as disclosed herein. For example, as described in detail below, feed-forward design system 101 can facilitate (e.g., via processor 103): performing analysis of a first layout of a first quantum chip; and modifying a second layout of a second quantum chip based on the analysis of the first layout.

In another example as described in detail below, feed-forward design system 101 can facilitate (e.g., via processor 103): performing analysis of the second layout of the second quantum chip; and modifying the first layout of the first quantum chip based on the analysis of the second quantum chip.

Analysis component 104 can perform analysis of a first layout of a first quantum chip. For example, analysis component 104 can receive the first layout of the first quantum chip designed by an entity. Analysis component 104 can then perform a physical, electromagnetic and/or quantum analysis of the first layout of the first quantum chip to determine performance characteristics of the first layout of the first quantum chip. In an embodiment, analysis component 104 can perform lumped oscillator model (LOM) analysis on the first layout of the first quantum chip. In an example, analysis component 104 can calculate a capacitance matrix of the first quantum chip based on the first layout to extract quantum values of the first quantum chip. These quantum values can comprise qubit frequency, charging energy, dephasing time, and/or another quantum value related to the first quantum chip. In another embodiment, analysis component 104 can perform energy participation ratio (EPR) analysis on the first layout of the first quantum chip. For example, analysis component 104 can utilize electromagnetic field distributions from eigenmode simulations and their participation ratios to extract quantum values, such as dissipative parameters, from the first quantum chip. It should be appreciated that analysis component 104 can utilize other methods of analysis, such as physical and/or electromagnetic analysis, For example, analysis component 104 can utilize electrical analysis to determine the critical current of the first layout of the first quantum chip. Additionally, it should be appreciated that in an embodiment, analysis component 104 can utilize multiple forms of analysis as part of a single overall analysis. For example, in an embodiment. Analysis component 104 can perform both EPR and LOM analysis on the first layout of the first quantum chip.

In an embodiment, analysis component 104 can perform analysis of the first layout of the first quantum chip prior to physical fabrication of the first quantum chip. For example, analysis component 104 can receive a design of the first layout of the first quantum chip designed by an entity. Analysis component 104 can then perform analysis on the first layout of the first quantum chip utilizing a simulation of the first quantum chip. In this embodiment, analysis component 104 can identify potential non-idealities that may occur during fabrication of the first quantum chip. For example, analysis component 104 can receive historical data comprising layouts of previously fabricated quantum chip and non-idealities that occurred during fabrication. Analysis component 104 can utilize machine learning to compare the layouts of previously fabricated quantum chips to the first layout of the first quantum chip. In this embodiment, analysis component 104 can identify one or more previously fabricated quantum chips that comprise one or more same or similar design parameters, such as through-silicon via location, coplanar waveguide location, qubit frequency, material composition, fabrication method and/or another parameter, wherein similarity is defined as within a threshold value. Analysis component 104 can evaluate the historical data to identify non-idealities that occurred in the previously fabricated quantum chips with the one or more same or similar design parameters as the first layout of the first quantum chip. For example, if analysis component 104 determines that historically, previously fabricated quantum chips with the same qubit frequency as the first layout of the first quantum chip resulted in a first non-ideality during fabrication, then analysis component 104 can predict that the first non-ideality may occur during fabrication of the first quantum chip. In another example, if analysis component 104 determines that historically, previously fabricated quantum chips with the same coplanar waveguide location as the first layout of the first quantum chip resulted in a second non-ideality during fabrication of the first quantum chip, then analysis component 104 can predict that the second non-ideality may occur during fabrication of the first quantum chip.

In another embodiment, analysis component 104 can perform analysis on the first layout of the first quantum chip after the first quantum chip is fabricated. For example, analysis component 104 can perform analysis on a fabricated first quantum chip. In this example, analysis component 104 can perform analysis on the fabricated first quantum chip, wherein the analysis comprises taking a measurement of a quantum value of the fabricated first quantum chip, such as qubit frequency, charging energy, dephasing time, dissipative parameters and/or another quantum value. These measurements can then be passed to modification component 106 to be used as described below. In this embodiment, analysis component 104 can identify non-idealities present in the fabricated first quantum chip. For example, analysis component 104 can receive a list of expected quantum values of the fabricated first quantum chip, such as expected qubit frequency, charging energy, dephasing time, dissipative parameters and/or another quantum value. Analysis component 104 can then compare the expected quantum values to the values actually observed as part of the analysis. Analysis component 104 can then identify any differences between expected quantum values and actually observed quantum values as non-idealities from the production process.

Modification component 106 can modify a second layout of a second quantum chip based on the analysis of the first layout of the first quantum chip. In an embodiment, modification component 106 can receive the second layout of the second quantum chip and the analysis performed by analysis component 104 on the first layout of the first quantum chip. In an embodiment, the second quantum chip can be a chip that will be connected to the first quantum chip, thereby forming a three-dimensional quantum chip. In another embodiment, the first quantum chip and the second quantum chip can be connected in an orientation to form a two-dimensional quantum chip arrangement, such as a tiled arrangement. Based on the analysis of the first layout of the first quantum chip and the second layout of the second quantum chip, modification component 106 can generate recommended modifications for the second layout of the second quantum chip. For example, if the analysis of the first layout of the first quantum chip shows that a large amount of reflection between the first quantum chip and the second quantum chip is possible, modification component 106 can recommend moving a through-silicon via on the second layout of the second quantum chip in order to reduce reflection. In another example, if the analysis of the first layout of the first quantum chip shows a possibility of a large amount of cross talk between the first quantum chip and the second quantum chip, modification component 106 can recommend modifying a qubit position on the second layout of the second quantum chip to reduce cross talk with a coplanar wave guide on the first layout of the first quantum chip. It should be appreciated that modification component 106 is not limited to the above-described examples and can recommend modifications for any design parameter of the second layout of the second quantum chip. In an embodiment, modification component 106 can pass the recommended modifications to an entity, such as a user. In this embodiment, the entity can either accept, reject, or further modify the recommended modifications to modify the second layout of the second quantum chip. In another embodiment, modification component 106 can automatically modify the second layout of the second quantum chip based on the generated modifications. In an embodiment, the modified second layout of the second quantum chip can be used to create a fabricated second quantum chip. For example, feed-forward design system 101 can be coupled to a fabricator, which can receive a layout for a quantum chip and fabricate the quantum chip from physical materials according to the received layout. In this example, the fabricator can receive the modified second layout of the second quantum chip and fabricate the second quantum chip according to the modified second layout.

In an embodiment, analysis component 104 can perform analysis of the second layout of the second quantum chip. For example, analysis component 104 can perform analysis on the second layout of the second quantum chip in the same manner as described above in reference to the first layout of the first quantum chip. Similarly, modification component 106 can modify the first layout of the first quantum chip based on the analysis of the second layout. For example, modification component 106 can modify the first layout of the first quantum chip in the same manner as described above in reference to the second layout of the second quantum chip. In this embodiment, analysis component 104 and modification component 106 can form a feedback loop in which the first quantum chip is analyzed, the second quantum chip is modified, the second quantum chip is analyzed, the first quantum chip is modified, and the first quantum chip is analyzed again to repeat the loop. This feedback loop can repeat until a defined criteria is met. For example, the feedback loop can repeat for a defined number of iterations, for a defined amount of time, and/or until a threshold quantum value of the first quantum chip and/or the second quantum chip is achieved.

In another embodiment, analysis component 104 can perform analysis on the first layout of the first quantum chip and the second layout of the second quantum chip after the first quantum chip and the second quantum chip are connected. For example, analysis component 104 can receive a design for a first layout of a first quantum chip as described above. Analysis component 104 can then receive a design for a second layout of a first quantum chip and a definition of how the first quantum chip and the second quantum chip are connected. Using the design of the first quantum chip, the design of the second quantum chip and the definition of the connection, analysis component 104 can simulate the three-dimensional quantum chip formed by the connection of the first quantum chip and the second quantum chip. Analysis component 104 can then perform analysis on the simulated three-dimensional quantum chip to determine quantum values for the first quantum chip when connected to the second quantum chip. These quantum values can then be compared to quantum values determined by analysis component 104 from the first quantum chip when unconnected to the second quantum chip. The difference between these two sets of quantum values can then be passed to modification component 106, which can modify the first layout of the first quantum chip as described above in order to decrease the difference between the two sets of quantum values. In another example, rather than simulating the first quantum chip, the second quantum chip, and the connection between the first and second quantum chip, analysis component 104 can perform analysis on a fabricated first quantum chip connected to a fabricated second quantum chip. Based on this analysis, modification component 106 can generate recommended modifications to the first layout of the first quantum chip and/or the second layout of the second quantum chip as described in detail above. In an embodiment, the recommended modifications to the layout of the first quantum chip and/or the second layout of the second quantum chip can be used to fabricate the first quantum chip and/or the second quantum chip.

It should be appreciated that analysis component 104 and modification component 106 can perform analysis and modification on any number of quantum chips. For example, in the same manner as described above in reference to the first quantum chip and the second quantum chip, analysis component 104 and modification component 106 can perform analysis and modification for a third layout of a third quantum chip, a fourth layout of a fourth quantum chip, etc.

Figure 2:
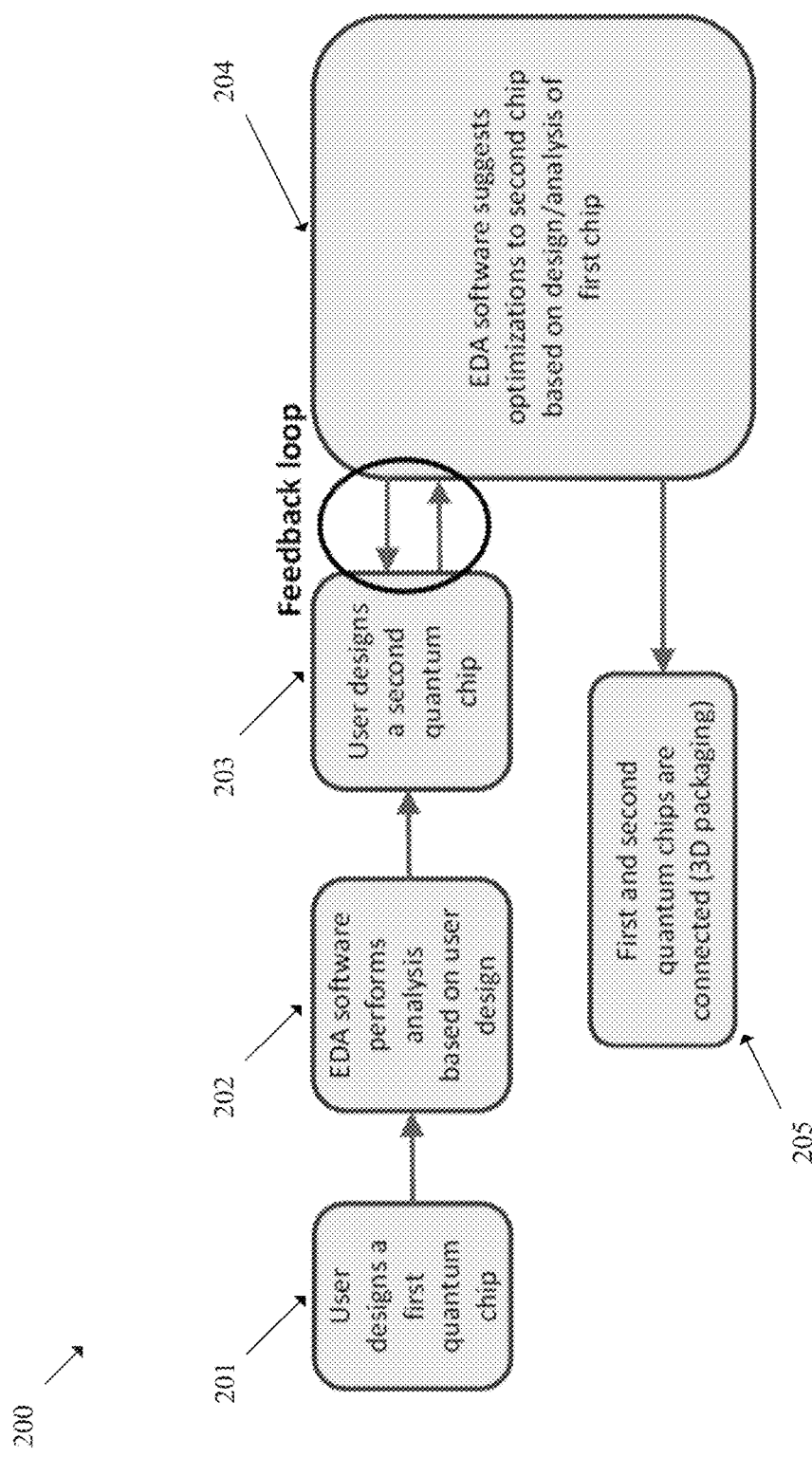
FIG. 2 illustrates a flow diagram of an example, non-limiting computer implemented method that can facilitate feed-forward design of three-dimensional quantum chips.

FIG. 2 illustrates a flow diagram of an example, non-limiting computer implemented method 200 that can facilitate feed-forward design of three-dimensional quantum chips. Repetitive description of like elements and/or processes employed in respective embodiments is omitted for the sake of brevity.

At 201, computer-implemented method 200 can comprise receiving, by a system (e.g., feed-forward design system 101 and/or analysis component 104) operatively coupled to a processor (e.g., processor 103), a design for a first layout for a first quantum chip designed by an entity.

At 202, computer-implemented method 200 can comprise performing, by the system (e.g., feed-forward design system 101 and/or analysis component 104), analysis on the first layout of the first quantum chip in order to determine one or more quantum values for the first layout of the first quantum chip.

At 203, computer-implemented method 200 can comprise receiving, by the system (e.g., feed-forward design system 101 and/or modification component 106), a design for a second layout for a second quantum chip.

At 204, computer-implemented method 200 can comprise suggesting, by the system (e.g., feed-forward design system 101 and/or modification component 106), modifications to the second layout of the second quantum chip based on the analysis of the first layout of the first quantum chip. After, suggesting modifications, method 200 can enter into a feedback loop, wherein analysis component 104 can analyze the modified second layout of the second quantum chip and modification component 106 can suggest modifications to the first layout of the first quantum chip based on the analysis of the modified second layout of the second quantum chip.

Figure 3:
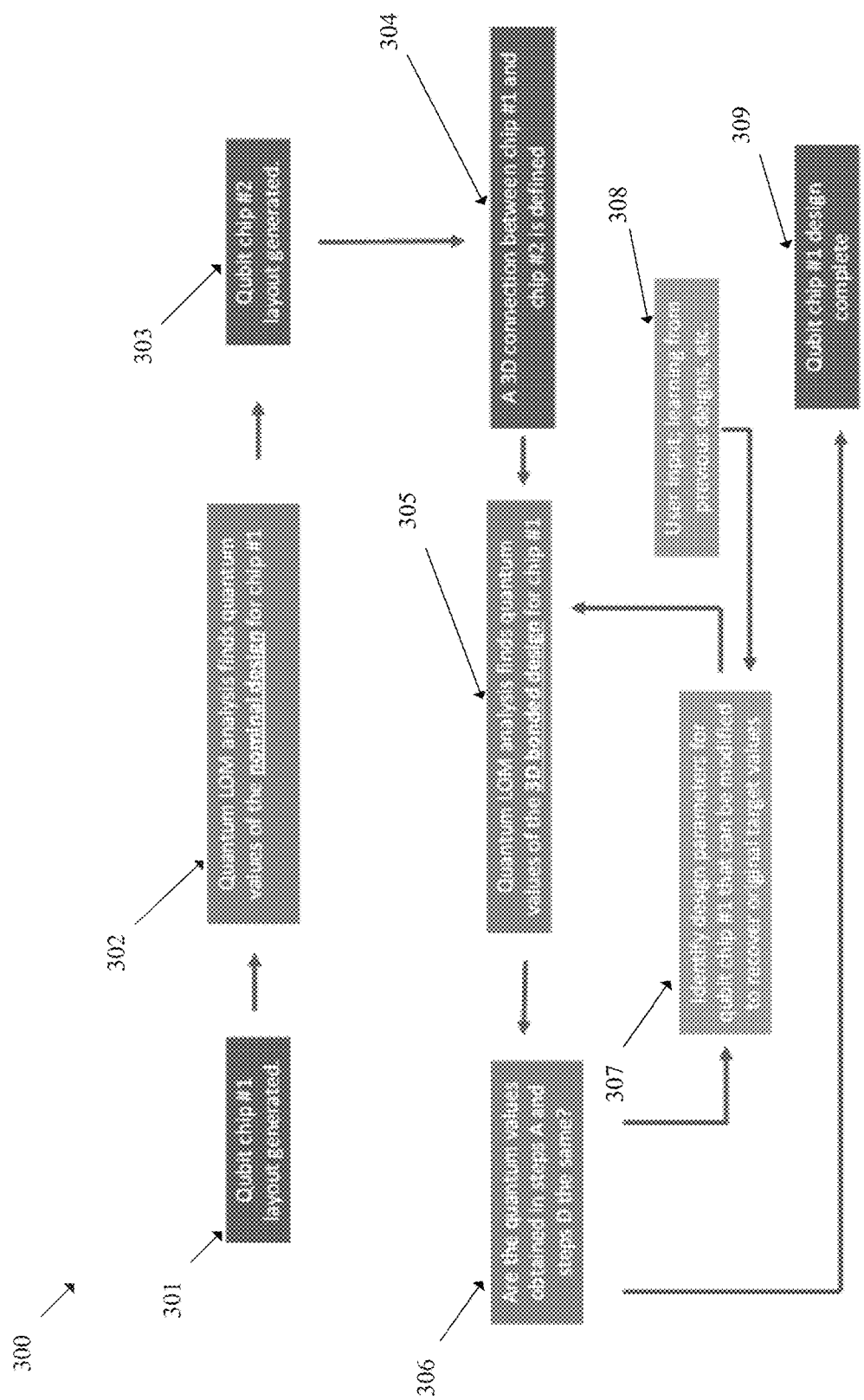
FIG. 3 illustrates a flow diagram of an example, non-limiting computer implemented method that can facilitate feed-forward design of three-dimensional quantum chips.

FIG. 3 illustrates a flow diagram of an example, non-limiting computer implemented method 300 that can facilitate feed-forward design of three-dimensional quantum chips. Repetitive description of like elements and/or processes employed in respective embodiments is omitted for the sake of brevity.

At 301, computer-implemented method 300 can comprise receiving, by a system (e.g., feed-forward design system 101 and/or analysis component 104) operatively coupled to a processor (e.g., processor 103), a design for a first layout for a first quantum chip as described above in reference to FIG. 1.

At 302, computer-implemented method 300 can comprise performing, by the system (e.g., feed-forward design system 101 and/or analysis component 104), analysis on the first layout of the first quantum chip in order to determine one or more quantum values for the first layout of the first quantum chip. For example, analysis component 104 can utilize LOM analysis.

At 303, computer-implemented method 300 can comprise receiving, by the system (e.g., feed-forward design system 101 and/or modification component 106), a second layout for a second quantum chip and modifying the second layout of the second quantum chip based on the analysis of the first layout as described in detail above in reference to FIG. 1.

At 304, computer-implemented method 300 can comprise receiving, by the system (e.g., feed-forward design system 101 and/or analysis component 104), a definition of how the first quantum chip and the second quantum chip are connected. For example, the connection definition can describe how the chips are oriented relative to one another.

At 305, computer-implemented method 300 can comprise performing, by the system (e.g., feed-forward design system 101 and/or analysis component 104), analysis to determine one or more quantum values of the first quantum chip as part of the three-dimensional quantum chip formed by the connection of the first and second quantum chips.

At 306, computer-implemented method 300 can comprise comparing, by the system (e.g., feed-forward design system 101 and/or analysis component 104), the one or more quantum values determined by analysis component 104 at steps 302 and 305. If the one or more quantum values determined at steps 302 and 305 are the same or within a threshold difference of one another, a defined number of feedback iterations is reached and/or a defined amount of time has passed, method 300 can proceed to step 309 wherein the analysis and modification of the first layout of the first quantum chip is complete. Otherwise, method 300 can proceed to step 307 where modification component 106 can identify design parameters of the first layout of the first quantum chip in order to decrease the difference between the one or more quantum values determined at steps 302 and 305.

At 307, computer-implemented method 300 can comprise modifying, by the system (e.g., feed-forward design system 101 and/or modification component 106), design parameters of the first layout of the first quantum chip in order to decrease the difference between the one or more quantum values determined at steps 302 and 305.

At 308, computer-implemented method 300 can comprise receiving, by the system (e.g., feed-forward design system 101 and/or modification component 106), input, such as that from an entity on whether to accept or reject the modifications and/or additional modifications to implement. Method 300 can then return to step 305 to perform analysis on the modified first layout of the first quantum chip connected to the second quantum chip.

It should be appreciated that a feedback loop can be established between steps 305, 306 and 307 during which multiple iterations of analysis and feedback are performed. It should also be appreciated that step 307 can additionally comprise modifying design parameters of the second layout of the second quantum chip.

Figure 4:
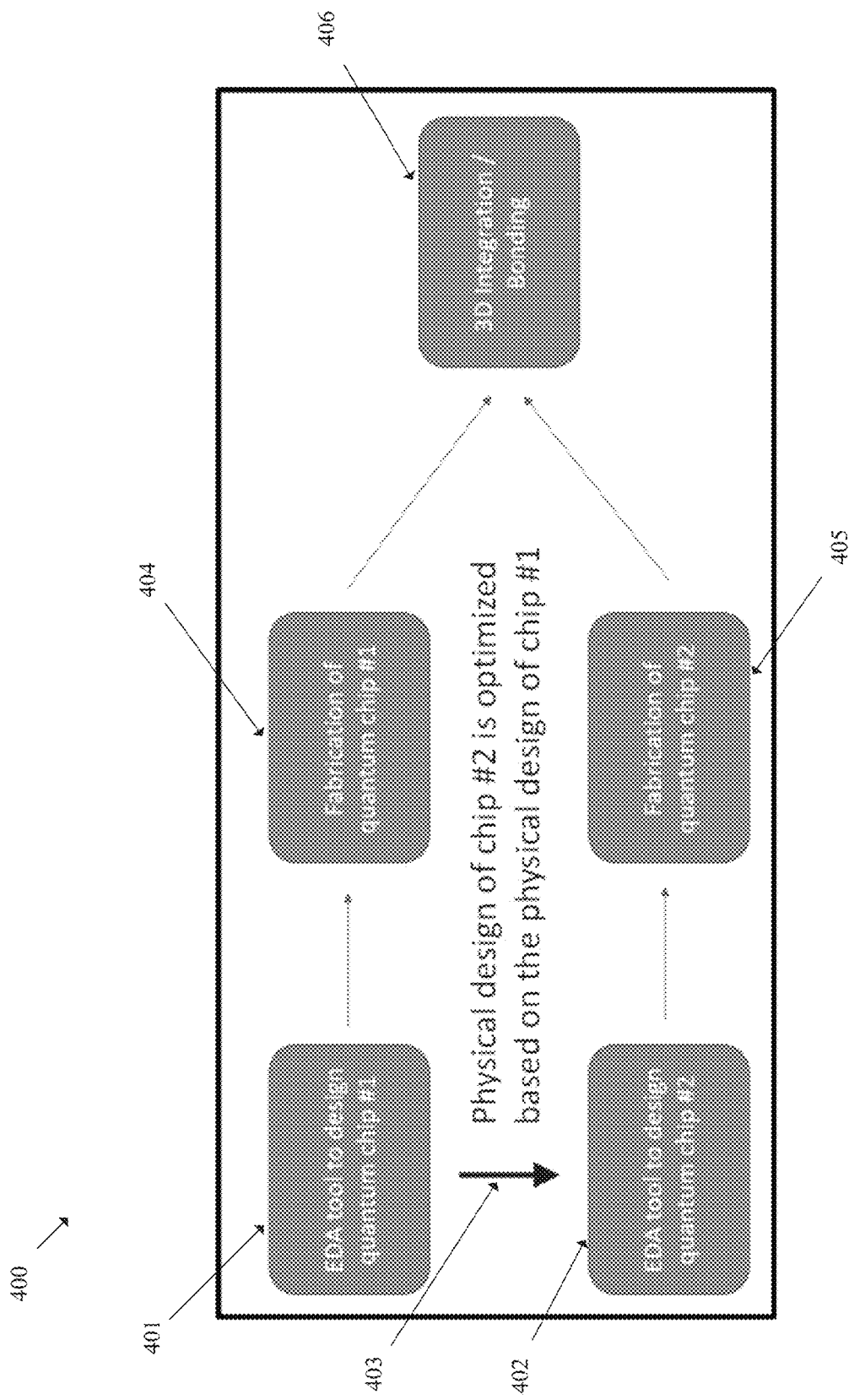
FIG. 4 illustrates a flow diagram of an example, non-limiting method that can facilitate one-way feed-forward design of three-dimensional quantum chips.

FIG. 4 illustrates a flow diagram of an example, non-limiting method 400 that can facilitate one-way feed-forward design of three-dimensional quantum chips. Repetitive description of like elements and/or processes employed in respective embodiments is omitted for the sake of brevity.

At 401, an entity can use an electronic design automation (EDA) tool to design a first layout of a first quantum chip. This design can then be passed to analysis component 104 which can perform analysis on the first layout as described above in detail in reference to FIG. 1.

At 402, an entity can use the EDA tool to design a second layout of a second quantum chip. The design of the second quantum chip can then be passed to modification component 106.

At 403, modification component 106 can utilize one or more quantum values from the analysis of the first layout of the first quantum chip to modify one or more design parameters of the design of the second quantum chip.

At 404, the first quantum chip can be fabricated according to the design made at step 401. Similarly, at 405 the second quantum chip can be fabricated according to the design modified at 403.

At 406, the fabricated first quantum chip and the fabricated second quantum chip can be bonded together to form a three-dimensional quantum chip. It should be appreciated that in this example, modification is one-way as only the design of the second quantum chip was modified.

Figure 5:
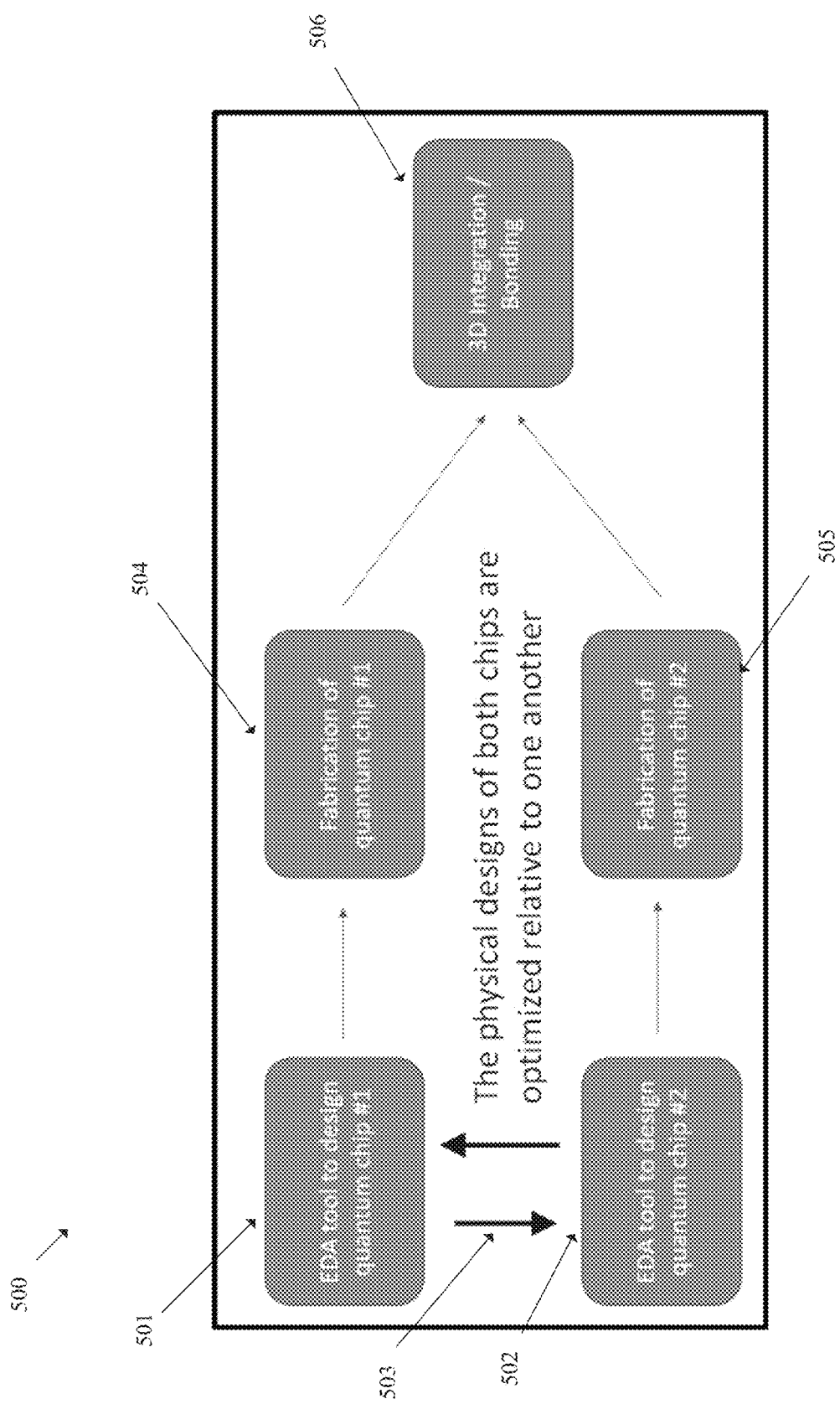
FIG. 5 illustrates a flow diagram of an example, non-limiting method that can facilitate two-way feed-forward design of three-dimensional quantum chips.

FIG. 5 illustrates a flow diagram of an example, non-limiting method 500 that can facilitate two-way feed-forward design of three-dimensional quantum chips. Repetitive description of like elements and/or processes employed in respective embodiments is omitted for the sake of brevity.

At 501, an entity can use an electronic design automation (EDA) tool to design a first layout of a first quantum chip. This design can then be passed to analysis component 104 which can perform analysis on the first layout as described above in detail in reference to FIG. 1.

At 502, an entity can use the EDA tool to design a second layout of a second quantum chip. The design of the second quantum chip can then be passed to modification component 106.

At 503, modification component 106 can utilize one or more quantum values from the analysis of the first layout of the first quantum chip to modify one or more design parameters of the design of the second quantum chip. Analysis component 104 can then perform analysis on the modified second layout of the second quantum chip and then modification component 106 can utilize the analysis of the modified second layout of the second quantum chip to modify one or more design parameters of the first layout of the first quantum chip.

At 504, the first quantum chip can be fabricated according to the design modified at 503. Similarly, at 505 the second quantum chip can be fabricated according to the design modified at 503.

At 506, the fabricated first quantum chip and the fabricated second quantum chip can be bonded together to form a three-dimensional quantum chip. It should be appreciated that in this example, modification is two-ways, as both the first layout of the first quantum chip and the second layout of the second quantum chip are modified.

Figure 6:
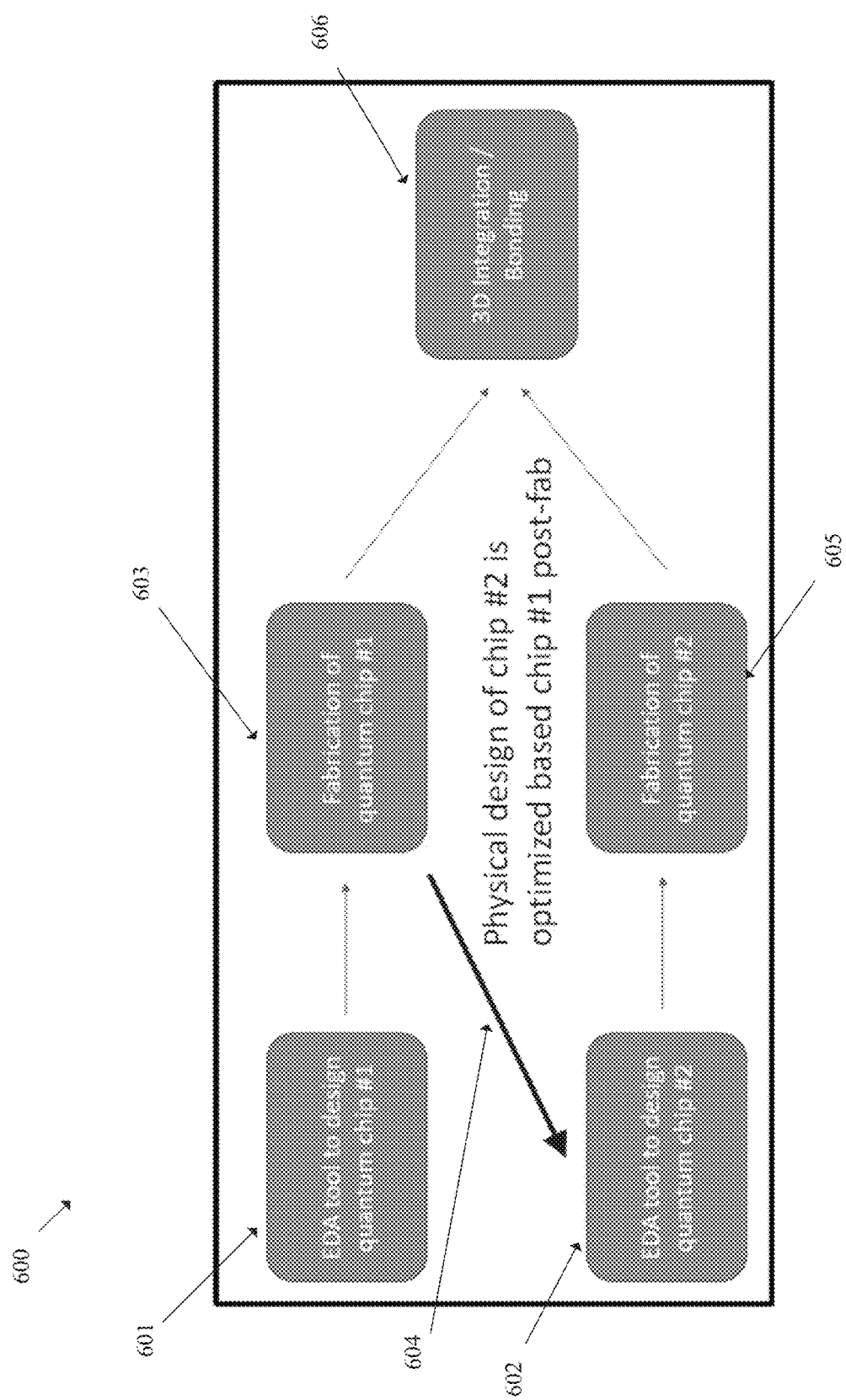
FIG. 6 illustrates a flow diagram of an example, non-limiting method that can facilitate one-way post fabrication feed-forward design of three-dimensional quantum chips.

FIG. 6 illustrates a flow diagram of an example, non-limiting method 600 that can facilitate one-way post fabrication feed-forward design of three-dimensional quantum chips. Repetitive description of like elements and/or processes employed in respective embodiments is omitted for the sake of brevity.

At 601, an entity can use an electronic design automation (EDA) tool to design a first layout of a first quantum chip.

At 602, an entity can use the EDA tool to design a second layout of a second quantum chip. The design of the second quantum chip can then be passed to modification component 106.

At 603, the first quantum chip can be fabricated according to the design made at step 601. Analysis component 104 can then perform analysis on the fabricated first quantum chip. It should be appreciated that by performing analysis on the fabricated first quantum chip, non-idealities from the fabrication process can be identified.

At 604, modification component 106 can utilize one or more quantum values from the analysis of the fabricated first layout of the first quantum chip to modify one or more design parameters of the design of the second quantum chip.

At 605 the second quantum chip can be fabricated according to the design modified at 604.

At 606, the fabricated first quantum chip and the fabricated second quantum chip can be bonded together to form a three-dimensional quantum chip. It should be appreciated that in this example, modification is one-way as only the second quantum chip is modified, and modification is post fabrication of the first quantum chip.

Figure 7:
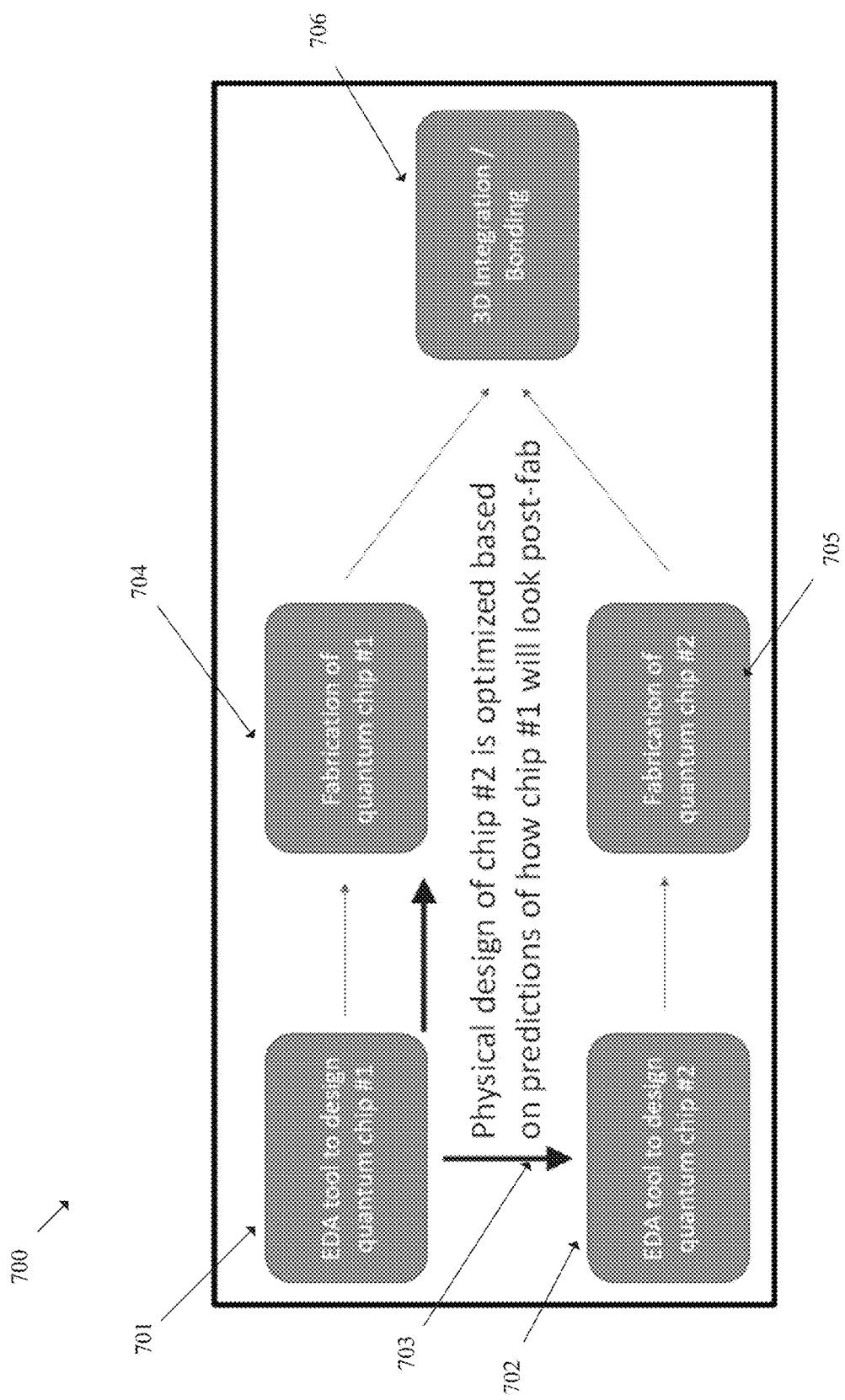
FIG. 7 illustrates a flow diagram of an example, non-limiting method that can facilitate predictive one-way pre-fabrication feed-forward design of three-dimensional quantum chips.

FIG. 7 illustrates a flow diagram of an example, non-limiting method that can facilitate predictive one-way pre-fabrication feed-forward design of three-dimensional quantum chips. Repetitive description of like elements and/or processes employed in respective embodiments is omitted for the sake of brevity.

At 701, an entity can use an electronic design automation (EDA) tool to design a first layout of a first quantum chip. This design can then be passed to analysis component 104 which can perform analysis on the first layout as described above in detail in reference to FIG. 1. As part of this analysis, analysis component 104 can generate predictions on non-idealities that may occur as part of the fabrication process of the first quantum chip.

At 702, an entity can use the EDA tool to design a second layout of a second quantum chip. The design of the second quantum chip can then be passed to modification component 106.

At 703, modification component 106 can utilize one or more quantum values from the analysis of the first layout of the first quantum chip and predicted non-idealities of the first quantum chip to modify one or more design parameters of the design of the second quantum chip.

At 704, the first quantum chip can be fabricated according to the design made at step 701. Similarly, at 705 the second quantum chip can be fabricated according to the design modified at 703.

At 706, the fabricated first quantum chip and the fabricated second quantum chip can be bonded together to form a three-dimensional quantum chip. It should be appreciated that in this example modification is one-way as only the design of the second quantum chip was modified, and that in this example predicted non-idealities in the first quantum chip were utilized by modification component 106.

Figure 8:
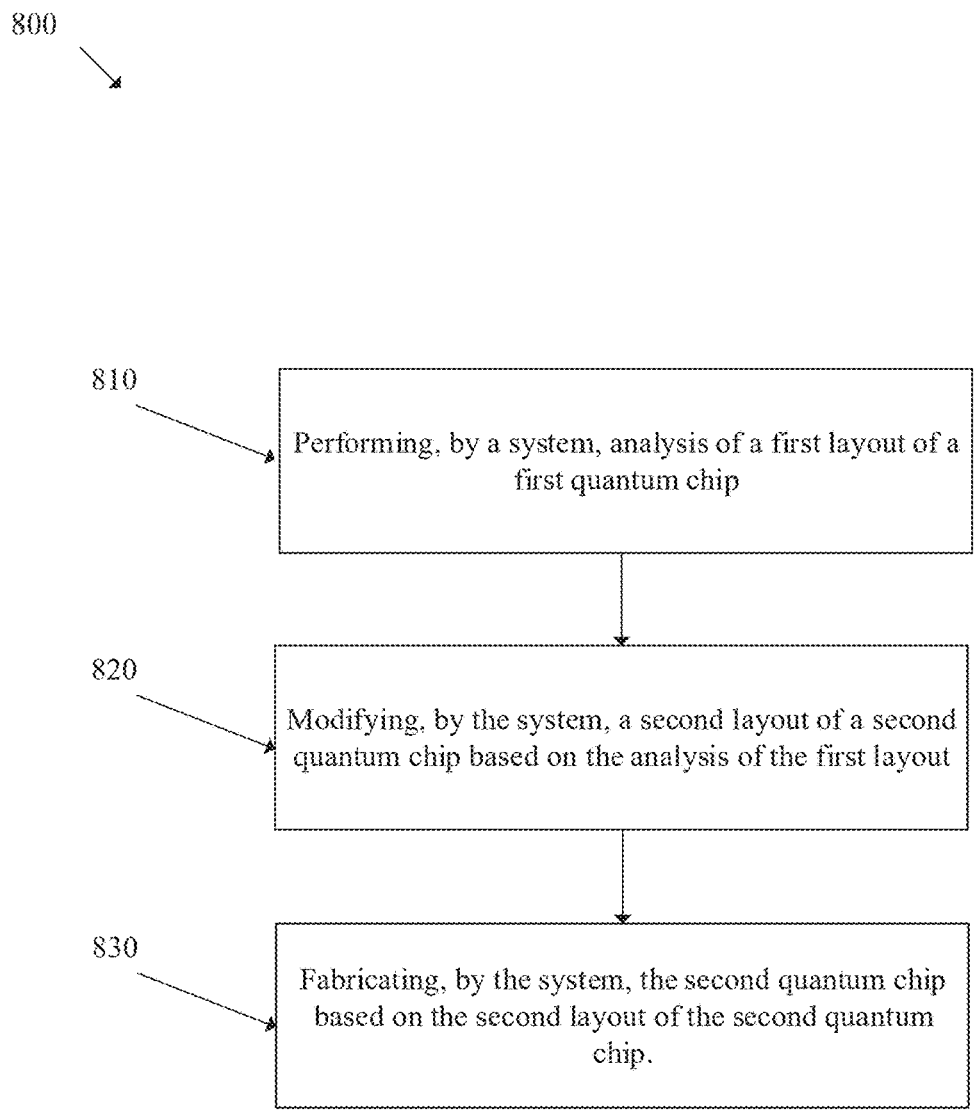
FIG. 8 illustrates a flow diagram of an example, non-limiting computer implemented method that can facilitate feed-forward design of three-dimensional quantum chips.

FIG. 8 illustrates a flow diagram of an example, non-limiting computer-implemented method 800 that can facilitate feed-forward design of three-dimensional quantum chips in accordance with one or more embodiments described herein. Repetitive description of like elements and/or processes employed in respective embodiments is omitted for the sake of brevity. Repetitive description of like elements and/or processes employed in respective embodiments is omitted for the sake of brevity.

At 810, computer-implemented method 800 can comprise performing, by a system (e.g., feed-forward design system 101 and/or analysis component 104) operatively coupled to a processor (e.g., processor 103), analysis of a first layout of a first quantum chip. For example, as described above in reference to FIG. 1, analysis component 104 can perform energy participation ratio analysis, lumped oscillator model analysis and/or another form of analysis to take a measurement of a quantum value of the first quantum chip, such as wherein the analysis comprises taking a measurement of a quantum value of the fabricated first quantum chip, such as qubit frequency, charging energy, dephasing time, dissipative parameters and/or another quantum value.

At 820, computer-implemented method 800 can comprise modifying, by the system (e.g., feed-forward design system 101 and/or modification component 106), a second layout of a second quantum chip based on the analysis of the first layout. For example, as described above in reference to FIG. 1, modification component 106 can modify a through-silicon via position on the second chip, modify a qubit position on the second chip and/or perform another modification.

At 830, computer-implemented method 800 can comprise fabricating, by the system (e.g., feed-forward design system 101 and/or the fabricator), the second quantum chip based on the second layout of the second quantum chip.

Figure 9:
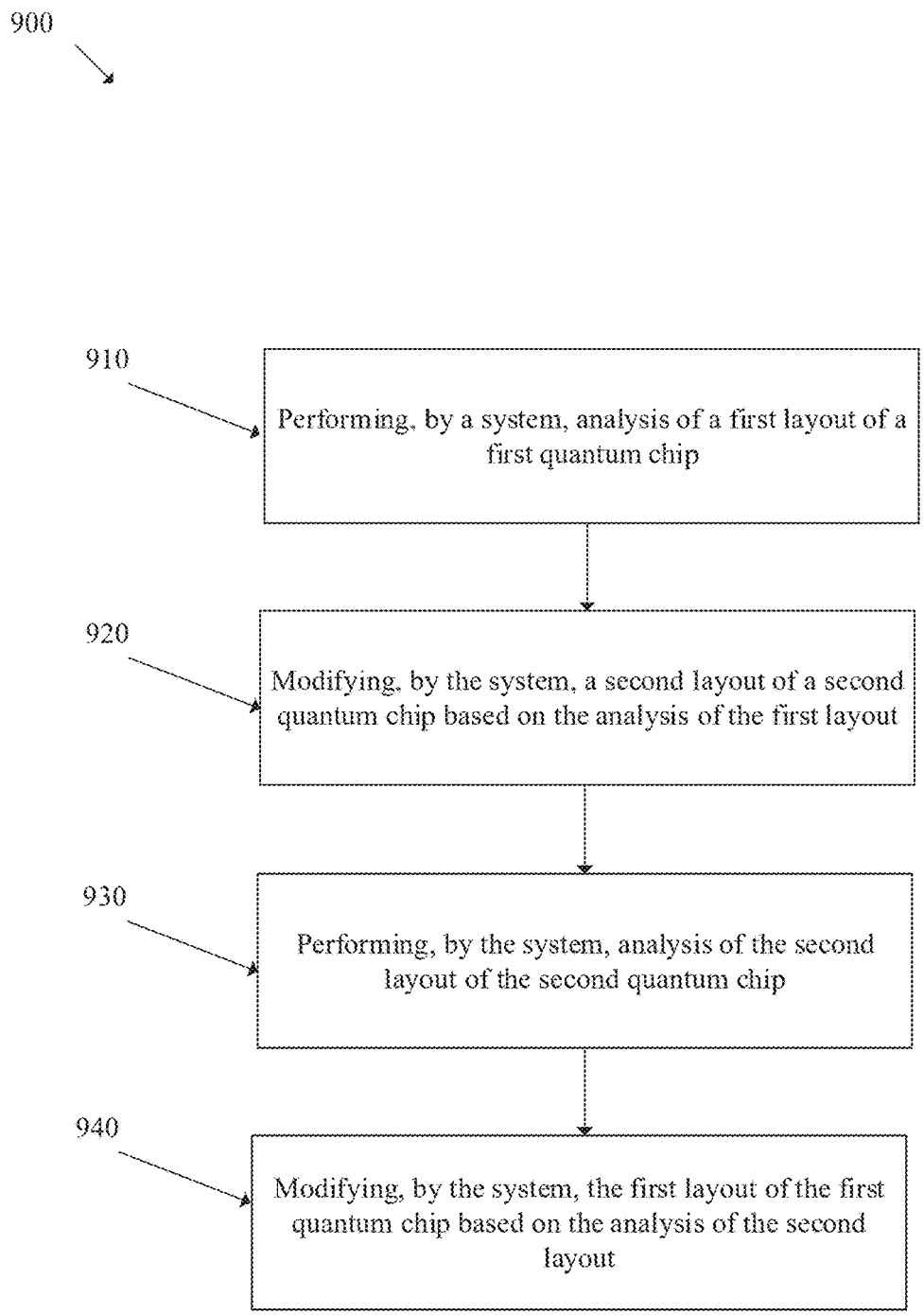
FIG. 9 illustrates a flow diagram of an example, non-limiting computer implemented method that can facilitate feed-forward design of three-dimensional quantum chips.

FIG. 9 illustrates a flow diagram of an example, non-limiting computer-implemented method 900 that can facilitate feed-forward design of three-dimensional quantum chips in accordance with one or more embodiments described herein. Repetitive description of like elements and/or processes employed in respective embodiments is omitted for the sake of brevity.

At 910, computer-implemented method 900 can comprise performing, by a system (e.g., feed-forward design system 101 and/or analysis component 104) operatively coupled to a processor (e.g., processor 103), analysis of a first layout of a first quantum chip. For example, as described above in reference to FIG. 1, analysis component 104 can perform energy participation ratio analysis, lumped oscillator model analysis and/or another form of analysis.

At 920, computer-implemented method 900 can comprise modifying, by the system (e.g., feed-forward design system 101 and/or modification component 106), a second layout of a second quantum chip based on the analysis of the first layout. For example, as described above in reference to FIG. 1, modification component 106 can modify a through-silicon via position on the second chip, modify a qubit position on the second chip and/or perform another modification.

At 930, computer-implemented method 900 can comprise performing by the system (e.g., feed-forward design system 101 and/or analysis component 104), analysis of the second layout of the second quantum chip. For example, as described above in reference to FIG. 1, analysis component 104 can perform energy participation ratio analysis, lumped oscillator model analysis and/or another form of analysis.

At 940, computer-implemented method 900 can comprise modifying, by the system (e.g., feed-forward design system 101 and/or modification component 106), the first layout of the first quantum chip based on the analysis of the second layout. For example, as described above in reference to FIG. 1, modification component 106 can modify a through-silicon via position on the first chip, modify a qubit position on the first chip and/or perform another modification.

In the above examples, it should be appreciated that feed-forward design system 101 can provide improvements to design and performance of three-dimensional quantum chips. For example, by modifying the second layout of the second quantum chip based on the analysis of the first layout of the first quantum chip, performance of a three-dimensional quantum chip formed by bonding the first quantum chip and the second quantum chip can be improved, as the design process of the second quantum chip takes the first quantum chip into consideration. In another example, by simulating the first layout of the first quantum chip and the second layout of the second quantum chip during analysis, feed-forward design system 101 can reduce design costs by modifying a design prior to fabrication, rather than modifying after fabrication and re-fabricating the modified design.

Feed-forward design system 101 can provide technical improvements to a processing unit associated with a three-dimensional quantum chip formed from the first quantum chip and the second quantum chip. For example, by modifying the second layout of the second quantum chip based on analysis of the first layout of the first quantum chip, feed-forward design system 101 can reduce reflection between the first and second quantum chips and/or reduce cross talk between the first and second quantum chip, thereby improving performance of the three-dimensional quantum chip. A practical application of feed-forward design system 101 is that it can be utilized to design three-dimensional quantum chips with improved performance compared to existing design methods.

Feed-forward design system 101 can employ hardware and/or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Feed-forward design system 101 and/or components thereof, can be employed to solve new problems that arise through advancements in technologies mentioned above, employment of quantum computing systems, cloud computing systems, computer architecture, and/or another technology.

It is to be appreciated that feed-forward design system 101 can utilize various combinations of electrical components, mechanical components, and circuitry that cannot be replicated in the mind of a human or performed by a human, as the various operations that can be executed by feed-forward design system 101 and/or components thereof as described herein are operations that are greater than the capability of a human mind. For example, the amount of data processed, the speed of processing such data, or the types of data processed by feed-forward design system 101, such as quantum values gather as part of analysis, over a certain period of time can be greater, faster, or different than the amount, speed, or data type, that can be processed by a human mind over the same period of time. According to several embodiments, feed-forward design system 101 can also be fully operational toward performing one or more other functions (e.g., fully powered on, fully executed, and/or another function) while also performing various operations described herein. It should be appreciated that such simultaneous multi-operational execution is beyond the capability of a human mind.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
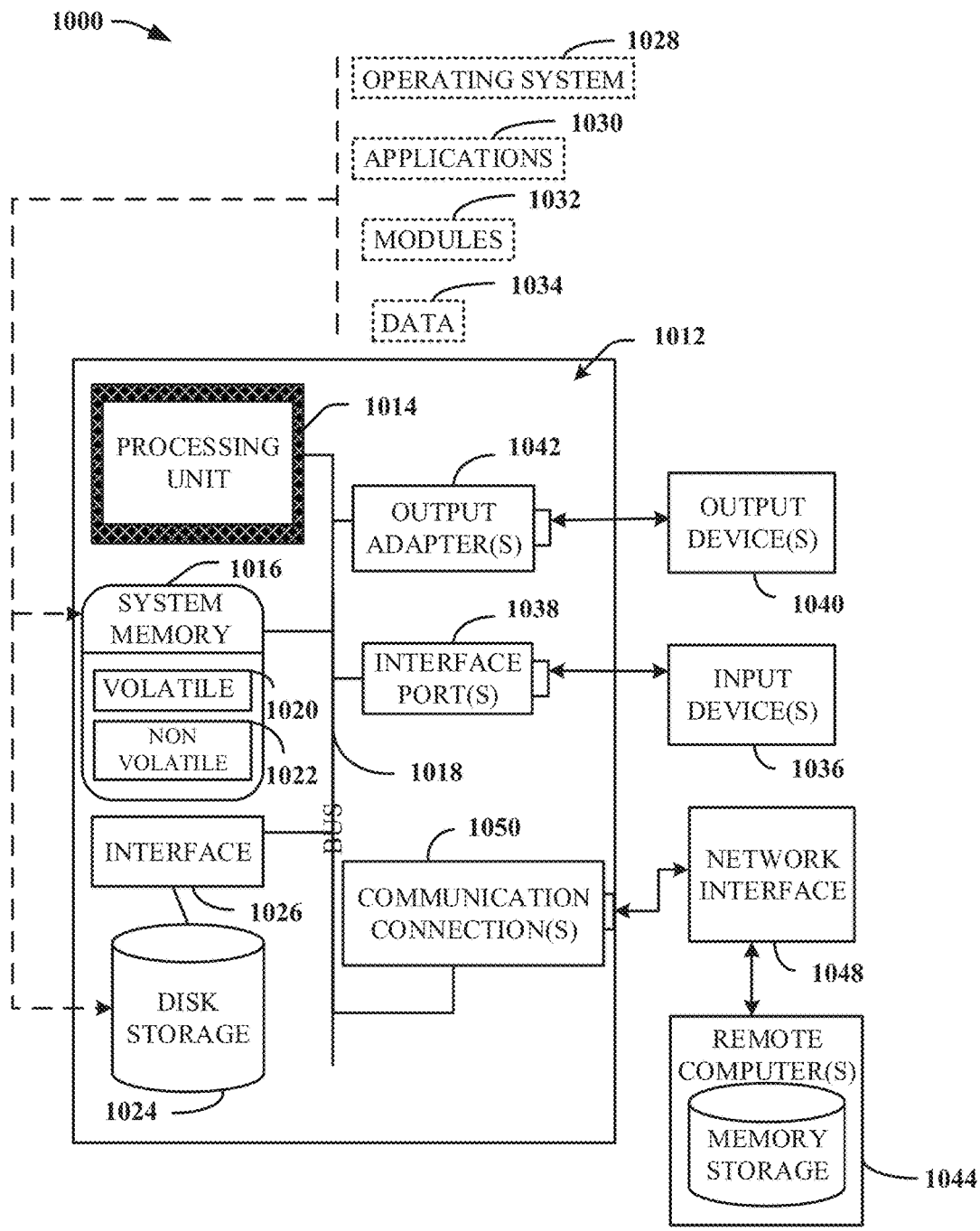
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 824, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 846 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
performing, by a system operatively coupled to a processor, analysis of a first design representation of a first layout of a first quantum chip that is to be connected to a second quantum chip to form a three-dimensional quantum chip, wherein performing the analysis comprises simulating the first design representation of the first quantum chip based on the first layout to extract quantum values of the first quantum chip; and
modifying, by the system, a second design representation of a second layout of the second quantum chip based on the analysis of the first design representation of the first layout of the first quantum chip to optimize the three-dimensional quantum chip according to a defined criterion associated with performances of the first quantum chip and the second quantum chip, wherein the modifying the second layout of the second quantum chip comprises simulating the second design representation of the second quantum chip based on the second layout to extract quantum values of the second quantum chip.

2. The computer-implemented method of claim 1, wherein the first quantum chip and the second quantum chip are electrically connected.

3. The computer-implemented method of claim 1, wherein at least one of the simulation of the first design representation or the simulation of the second design representation comprises energy participation ratio analysis.

4. The computer-implemented method of claim 1, wherein at least one of the simulation of the first design representation or the simulation of the second design representation comprises lumped oscillator model analysis.

5. The computer-implemented method of claim 1 further comprising:
performing, by the system, a second analysis of the second design representation of the second layout of the second quantum chip, wherein the second analysis comprises the simulation of the second design representation; and
modifying, by the system, the first design representation of the first layout of the first quantum chip based on the analysis of the second design representation of the second layout of the second quantum chip to optimize the three-dimensional quantum chip according to the defined criterion.

6. The computer-implemented method of claim 1, wherein the second layout of the second quantum chip is modified after fabrication of the first quantum chip.

7. The computer-implemented method of claim 1, wherein a modification of the second quantum chip is based on a predicted non-ideality of the first quantum chip.

8. A system comprising:
a memory that stores computer executable components;
a processor that the executes at least one of the computer executable components that:
performs an analysis of a first design representation of a first layout of a first quantum chip that is to be connected to a second quantum chip to form a three-dimensional quantum chip, wherein performing the analysis comprises simulating the first design representation of the first quantum chip based on the first layout to extract quantum values of the first quantum chip; and
modifies a second design representation of a second layout of the second quantum chip based on the analysis of the first design representation of the first layout of the first quantum chip to optimize the three-dimensional quantum chip according to a defined criterion associated with reducing detrimental associated with performances of the first quantum chip and the second quantum chip, wherein the modifying the second layout of the second quantum chip comprises simulating the second design representation of the second quantum chip based on the second layout to extract quantum values of the second quantum chip.

9. The system of claim 8, wherein the first quantum chip and the second quantum chip are electrically connected.

10. The system of claim 8, wherein at least one of the simulation of the first design representation or the simulation of the second design representation comprises energy participation ratio analysis.

11. The system of claim 8, wherein at least one of the simulation of the first design representation or the simulation of the second design representation comprises lumped oscillator model analysis.

12. The system of claim 8, wherein the at least one of the computer executable components further:
    performs a second analysis of the second design representation of the second layout of the second quantum chip, wherein the second analysis comprises the simulation of the second design representation; and
    modifies the first design representation of the first layout of the first quantum chip based on the analysis of the second design representation of the second layout of the second quantum chip to optimize the three-dimensional quantum chip according to the defined criterion.

13. The system of claim 8, wherein the second layout of the second quantum chip is modified after fabrication of the first quantum chip.

14. The system of claim 8, wherein a modification of the second quantum chip is based on a predicted non-ideality of the first quantum chip.

15. A computer program product comprising a computer readable storage medium having program instructions embodied therewith, the program instructions executable by a processor to cause the processor to:
    perform, by the processor, analysis of a first design representation of a first layout of a first quantum chip that is to be connected to a second quantum chip to form a multiple quantum chip arrangement, wherein performing the analysis comprises simulating the first design representation of the first quantum chip based on the first layout to extract quantum values of the first quantum chip; and
    modifying, by the processor, a second design representation of a second layout of the second quantum chip based on the analysis of the first design representation of the first layout of the first quantum chip to optimize the multiple quantum chip arrangement according to a defined criterion associated with performances of the first quantum chip and the second quantum chip, wherein the modifying the second layout of the second quantum chip comprises simulating the second design representation of the second quantum chip based on the second layout to extract quantum values of the second quantum chip.

16. The computer program product of claim 15, wherein the first quantum chip and the second quantum chip are electrically connected.

17. The computer program product of claim 15, wherein at least one of the simulation of the first design representation or the simulation of the second design representation comprises energy participation ratio analysis.

18. The computer program product of claim 15, wherein at least one of the simulation of the first design representation or the simulation of the second design representation comprises lumped oscillator model analysis.

19. The computer program product of claim 15, wherein the program instructions are further executable by the processor to cause the processor to:
    perform, by the processor, a second analysis of the second design representation of the second layout of the second quantum chip, wherein the second analysis comprises the simulation of the second design representation; and
    modify, by the processor, the first design representation of the first layout of the first quantum chip based on the analysis of the second design representation of the second layout of the second quantum chip to optimize the multiple quantum chip arrangement according to the defined criterion.

20. The computer-program product of claim 15, wherein the second layout of the second quantum chip is modified after fabrication of the first quantum chip.

* * * * *